US008607965B2

(12) United States Patent
Sejourne

(10) Patent No.: US 8,607,965 B2
(45) Date of Patent: Dec. 17, 2013

(54) BRAKING ROLLER WITH TWO-PIECE SUPPORT STRUCTURE

(75) Inventor: Jerome Sejourne, Saint-Diery (FR)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 13/455,565

(22) Filed: Apr. 25, 2012

(65) Prior Publication Data

US 2012/0273328 A1    Nov. 1, 2012

(30) Foreign Application Priority Data

Apr. 26, 2011 (EP) ..................................... 11290199

(51) Int. Cl.
*B65G 13/075* (2006.01)
*B65G 39/12* (2006.01)

(52) U.S. Cl.
CPC .............. *B65G 13/075* (2013.01); *B65G 39/12* (2013.01)
USPC ........................... 198/534; 198/788; 193/35 A

(58) Field of Classification Search
USPC ........ 193/35 A, 35 C, 35 R, 37; 198/788, 534
See application file for complete search history.

(56) References Cited

U.S. PATENT DOCUMENTS

| | | | |
|---|---|---|---|
| 3,899,063 A * | 8/1975 | Pollard ........................ | 193/35 A |
| 5,048,672 A * | 9/1991 | Sundseth ...................... | 198/782 |
| 5,088,596 A | 2/1992 | Agnoff | |
| 5,147,020 A * | 9/1992 | Scherman et al. .......... | 193/35 A |
| 6,131,717 A * | 10/2000 | Owen .......................... | 193/35 A |
| 7,299,915 B2 * | 11/2007 | El-Ibiary ....................... | 198/788 |
| 7,581,630 B2 * | 9/2009 | Hong ............................. | 193/37 |
| 2004/0163934 A1* | 8/2004 | Kanaris ......................... | 198/783 |
| 2009/0101466 A1* | 4/2009 | Karcher ....................... | 193/35 A |
| 2009/0188777 A1 | 7/2009 | Hong | |

FOREIGN PATENT DOCUMENTS

| | | |
|---|---|---|
| DE | 7300091 | 4/1973 |
| DE | 44 26 106 | 1/1996 |
| DE | 10 2006 054 576 | 5/2008 |
| EP | 0 386 809 | 9/1990 |
| EP | 1 243 528 | 9/2002 |
| EP | 1 847 485 | 4/2006 |
| EP | 2 128 048 | 12/2009 |

* cited by examiner

*Primary Examiner* — Mark A Deuble
(74) *Attorney, Agent, or Firm* — Gerald E. Hespos; Michael J. Porco; Matthew T. Hespos

(57) ABSTRACT

A conveyor roller (10) has a circular sleeve element (20), at least one side cover (30) covering one face side of the conveyor roller (10), and an acceleration unit (50). The sleeve element (20) is supported rotatably about an axis of rotation of the sleeve element. The acceleration unit (50) is connected in a torque transmitting manner to the sleeve element (20) and the side cover (30) such that a rotational speed of the sleeve element (20) about the axis of rotation can be influenced by the acceleration unit (50). The side cover (30) has a geometrical frame mounting structure on its outer side for mounting the conveyor roller (10) in a torque proof manner to a frame element by a form fit. A conveyor path has a frame structure to which such a conveyor roller is mounted.

12 Claims, 4 Drawing Sheets

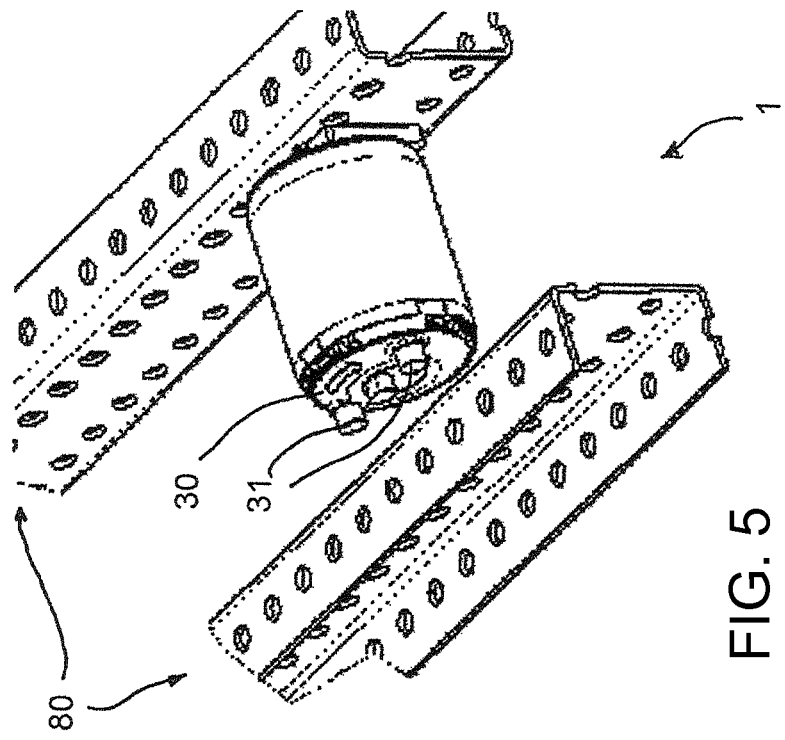
FIG. 5
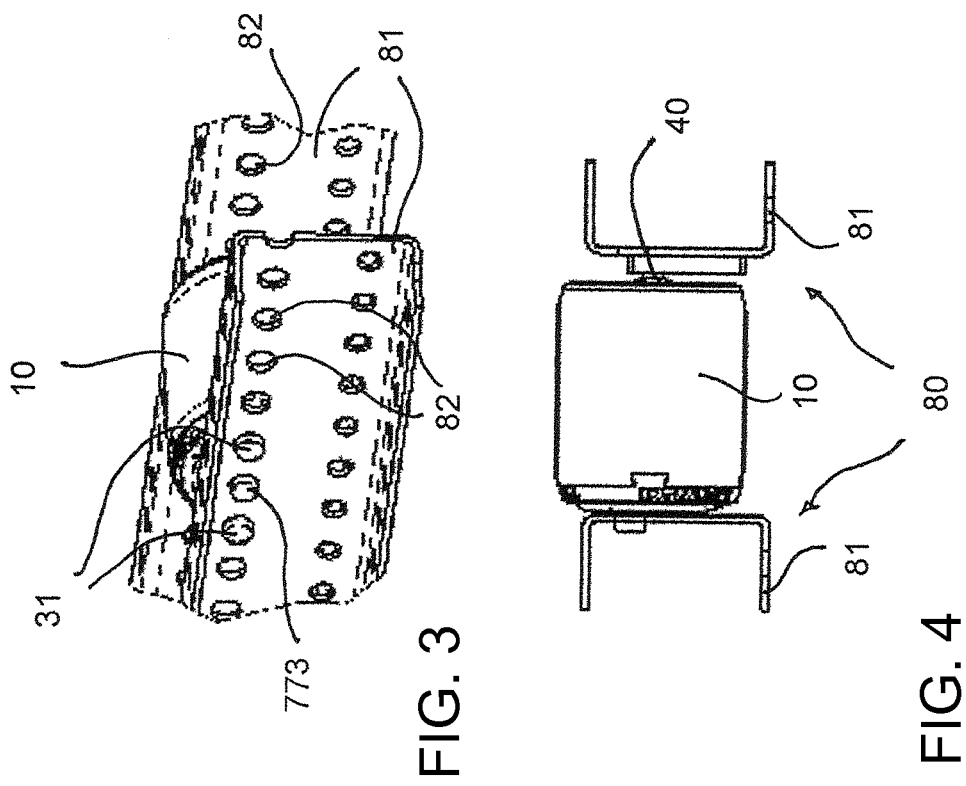
FIG. 3
FIG. 4

BRAKING ROLLER WITH TWO-PIECE SUPPORT STRUCTURE

BACKGROUND OF THE INVENTION

1. Field of the Invention

The invention relates to a conveyor roller and to a conveyor path comprising such a conveyor roller.

2. Description of the Related Art

Roller conveyors with rollers exist in the prior art. These roller conveyors are used, for example, in rack storage systems, wherein a rack can have a plurality of roller conveyors arranged above and alongside one another. A plurality of pallets with goods can be mounted one behind the other on a roller conveyor, these pallets being conveyed on the rollers.

The roller conveyors are generally loaded from one side and unloaded from the other side, so that the goods that pass onto the roller conveyors first are also unloaded again first therefrom. These rack storage systems are called first-in/first-out storage systems or FIFO storage systems. The conveyor paths of these FIFO conveyors may be arranged horizontally or may have an inclination which slopes from the loading point to the unloading point. In case of a horizontal conveyor path the conveyor may include driven rollers for accelerating and or retarding the goods on the conveyor path. In case of an inclined conveyor path pallets located on the conveyor path can be conveyed in the direction of the unloading point by gravitational force. Also in this case rollers including a drive or a brake may be provided.

Alternatively, the roller conveyors are loaded from one side and unloaded from the same side, so that the goods that pass onto the roller conveyors last are unloaded first therefrom. These rack storage systems are called last-in/first-out storage systems or LIFO storage systems. Some of these storage systems also have an inclination in the direction of the loading or unloading point. When loading a further new pallet, for example by means of a forklift truck, the pallets that are already located on the roller conveyor are pushed rearward by the new pallet counter to the inclination. Moreover, this inclination has the effect that the pallets located on the roller conveyor always line up at the unloading point following gravitational force.

In order to brake the speed of the pallets in the LIFO roller conveyors, also the rollers of the LIFO conveyors can in part be provided with brakes via which the speed of the rollers, and hence that of the pallets, can be retarded. It can thereby be prevented that the pallets run against one another at excessively high speed.

In some constructions, eddy-current brakes are used for this. Such a device for braking individual rollers of roller tracks is described in DE 7300091 U. A further construction is described in EP 1 243 528 A1.

A torque generated inside the rollers for accelerating the goods positively or negatively has to be transmitted to the frame of the conveyor.

Accordingly, rollers including a brake or an electrical motor need to be attached to a frame such that a torque generated within the roller can be transmitted or absorbed, in the frame of the conveyor.

It is an object of the invention to provide a compact conveyor roller and a conveyor path comprising at least one such conveyor roller, wherein conveyor rollers can be produced and mounted in the conveyor path in a cost-effective manner, wherein the conveyor rollers have a long service life and also have low maintenance and/or repair costs during their service life.

SUMMARY OF THE INVENTION

A first aspect for achieving the object is directed to a conveyor roller, comprising a circular sleeve element, at least one side cover covering one face side of the conveyor roller, and an acceleration unit, the sleeve element being rotatably supported about an axis of rotation of the sleeve element, the acceleration unit being connected in a torque transmitting manner to the sleeve element and the side cover such that a rotational speed of the sleeve element about the axis of rotation can be influenced by the acceleration unit, wherein the side cover comprises a geometrical frame mounting structure on its outer side for mounting the conveyor roller in a torque proof manner to a frame element by means of a form fit.

The sleeve element can be formed as a cylindrical tube portion having a circular cross section. The sleeve element can be made of a stable material, e.g. a metal or a metal alloy. The side cover can be generally disk shaped and/or may have a central hole.

The acceleration unit can be located inside the conveyor roller. The acceleration unit can comprise a brake, e.g. a centrifugal brake or a magnetic brake. Alternatively the acceleration unit can comprise a motor drive, in particular an electro motor.

In case the acceleration unit comprises a magnetic brake it can be configured as an eddy-current brake or a hysteresis brake.

An eddy-current brake is a wear-free brake that makes use of eddy-current losses. Here, an electrically conductive braking component, such as a metal disk or a metal tube, which can be formed as a rotor or as a stator, is moved in an external magnetic field generated by one or a plurality of permanent magnets or electromagnets, whereby currents are created in the braking component, which in turn generate a magnetic field that is opposed to the external magnetic field and thus brakes the braking component. The electrical resistance of the metal plate forms an ohmic load for the eddy currents, whereby the kinetic energy is converted to heat. In an eddy-current brake, the magnetizability of the braking component is not of importance for the induction, only the electrical conductivity is decisive. An advantage of eddy-current brakes is that they are maintenance-free. A hysteresis brake is a brake that is based on the effect of one or more magnets, such as a permanent magnet or an electromagnet, on a braking component moving relative to the magnet, said braking component comprising a ferromagnetic material. Here, the motion of the ferromagnetic material in the magnetic field leads to a continuous remagnetization of the ferromagnetic material. In contrast to an eddy-current brake, the generated force/the generated momentum is not speed or rotational speed-dependent in a hysteresis brake, i.e. the hysteresis brake operates uniformly from a standstill to a constructively possible maximum speed or rotational speed. Hysteresis brakes are also characterized by a particularly long service life.

The term "outer side" as used above refers to the side of the side cover located outside the conveyor roller. The term "torque proof" as used herein relates to a connection between parts which prevents a rotation of the connected parts which respect to each other, i.e. a connection of the connected parts in a rotationally fixed manner.

According to an embodiment of the above described conveyor roller the frame mounting structure may comprise two cover protrusions formed on the side cover at a distance from each other.

The cover protrusions can be formed integrally with the side cover or with at least one component of the side cover. The cover protrusions can be disposed at a radial distance from the axis of rotation of the sleeve element. In particular the cover protrusions can be disposed in an area of the side cover lying in a radially outward area of the sleeve element. For instance the cover protrusions can be disposed in an area of the side cover covering a circle having its centre point lying on the axis of rotation of the sleeve element, wherein the circle has a diameter which is bigger than thirty percent of the diameter of the sleeve element or a diameter which is bigger than fifty percent of the diameter of the sleeve element or a diameter which is bigger than sixty percent of the diameter of the sleeve element. Each of the cover protrusions may have a circular cross section. When the conveyor roller is mounted between two frame elements forming a frame structure of a conveyor path, the cover protrusions may extend through corresponding frame element openings in one of the frame elements.

Cover protrusions formed on the side cover at a distance from each other can transmit a higher torque than a geometrical frame mounting structure located in an inner area of the conveyor roller. Accordingly, the geometrical frame mounting structure can be made of a less stable material, like plastic material, which may reduce production costs.

A further embodiment is directed to a conveyor roller as described above, wherein the side cover is connected to the acceleration unit in a torque transmitting manner. The side cover can be connected to the acceleration unit directly or indirectly, e.g. by means of a transmission unit being kinematically disposed between the side cover and the acceleration unit.

The term "kinematically between" means that transmission unit is arranged along a brake train between the side cover and the acceleration unit, so that a torque generated by the acceleration unit, e.g. by a brake, can be transferred to the side cover.

Another embodiment of a conveyor roller as described above may further comprise a transmission component which is connected to the side cover in a rotationally fixed manner and which is kinematically located between the side cover and the acceleration unit.

Such a transmission component may form part of a transmission unit which comprises at least one planetary gearing.

According to a further embodiment of a conveyor roller as described above the planetary gearing may comprise a satellite holder, wherein the satellite holder is formed integrally with the transmission component.

The term "formed integrally" means that a single part is provided comprising both the satellite holder and the transmission component. Both the satellite holder and the transmission component can be made of one part. For instance, the satellite holder can be cast integrally with the transmission component in one part.

According to a further embodiment the transmission component can be connected to the side cover by a form fit in order to provide the torque proof connection. In case the transmission component is provided in the form of a satellite holder of a planetary gearing, torque generated in the acceleration unit can be transmitted via the satellite holder to the side cover of the conveyor roller. According to a further variation of such a conveyor roller, satellite pinions can be directly, i.e. without intermediate parts, fixed on the satellite holder. For this purpose cylindrical pinion protrusions can be formed integrally with the satellite holder and protrude through corresponding pinion openings of the satellite pinions. Accordingly, torque can be transmitted directly to the satellite holder without the need of intermediate parts so that the risk of failure is reduced.

According to a further embodiment of such a conveyor roller the transmission component can protrude through the side cover and comprises at least one transmission protrusion for mounting the conveyor roller in a frame structure.

Such a transmission component may be designed to bear or carry a vertical load when the conveyor roller is mounted in the frame structure. Accordingly, the design can be specifically adapted to this kind of applied load without the need of additionally considering the torque which is born by the side cover having the frame mounting structure.

In case the frame mounting structure comprises the above described two cover protrusions, the cover protrusions of the side cover and the transmission protrusion of the transmission component can be located in a straight line. The cover protrusions of the side cover and the transmission protrusion of the transmission component can have a similar or identical cross section, in particular a cylindrical cross section, such that all protrusions fit into frame element openings of the frame element. Equal distances may be provided between adjacent protrusions. In that case the protrusions can be slid into corresponding frame element openings arranged equidistantly along a straight line along a frame element of the conveyor path.

A further embodiment is directed to one of the above mentioned conveyor rollers, wherein the conveyor roller further comprises an axle element, wherein components of the transmission unit and/or components of the acceleration unit are rotatably supported on the axle element.

The components can be supported rotatably on the axle element such that any torque generated in the acceleration unit is transferred via the transmission component to the side cover, only. Consequently no torque is transmitted to or via the axle element. This construction allows for a simple and thin design of the axle element.

Still a further embodiment is directed to one of the above mentioned conveyor rollers, wherein a first axial end of the axle element is connected to the transmission component.

In this case the axle element may be connected to the inner side of the transmission component, i.e. such that the axle element does not protrude through the transmission component to the outside of the conveyor roller. Accordingly, it is not required to seal the axle element in the opening. The term "inner side" in this respect refers to the side of the side cover located inside the conveyor roller. The first axial end of the axle element may be contained in a corresponding axle element opening of the transmission component. Both the first axial end of the axle element and the corresponding axle element opening may have a circular cross section. The diameters of the first axial end of the axle element and the corresponding axle element opening may be designed for forming a loose fit, a shaft basis fit or a press fit.

An axle element of a further embodiment of one of the above described conveyor rollers may include a second axial end, wherein the second axial end of the axle element is protruding through the conveyor roller on the side of the conveyor roller opposite to the transmission component.

The conveyor roller can be designed such that the second side of the conveyor roller opposite the side cover respectively opposite the transmission component is rotatably supported on the axle element such that the sleeve can rotate about the axle element. When mounted in a conveyor path the second axial end of the axle element may extend through a corresponding frame opening of a frame element. Alternatively the second axial end may be connected to an intermediate mounting structure provided between the conveyor roller and the frame element.

Still another embodiment of one of the above described conveyor rollers is directed to a conveyor roller comprising at least one bearing arranged for rotationally supporting the roller sleeve, wherein one of the at least one bearings, is sandwiched in between the side cover and the transmission component. The bearing(s) can be provided as roller bearing (s) or as plain bearing(s).

A roller bearing usually has two races and rolling-elements placed between the races. Roller bearings can be designed with different types of rolling-elements, e.g. balls, cylindrical rollers, tapered rollers, spherical rollers, or needles. Regarding the roller bearing sandwiched in between the side cover and the transmission component, an inner race of the roller bearing can be biased by the side cover and the transmission component in a direction parallel to the axis of rotation, securing the roller bearing in the axial direction of the conveyor roller. Sandwiching the ball bearing in between the side cover and the transmission component allows for a compact design of the conveyor roller.

According to further embodiments of the above described conveyor rollers the transmission component can be made of a material comprising a metal and/or the side cover can be made made of a synthetical material.

The material of the transmission component may comprise an alloy, e.g. an alloy comprising zinc and aluminium. In particular the material of the transmission component may comprise zinc, aluminium, magnesium and copper, e.g. a Zamak-5 alloy.

The material of the side cover may comprise a plastic material in particular a glass fibre reinforced plastic material, e.g. glass fibre reinforced polyamide. This material has a good strength and enables transmission of the torque to the frame element of the conveyor path without the risk of failure. It also allows the side cover to be produced at reasonable cost. Glass fibre reinforced polyamide has elastic properties and is flexible. It can provide a design of the side cover which allows for a clipping function, i.e. the side cover can be clipped onto the transmission component. This allows an easy mounting procedure when the roller bearing is attached and secured between the side cover and the transmission component.

A second aspect for achieving the object is directed to a conveyor path comprising a frame structure to which at least one of the above described conveyor rollers is mounted.

The frame structure of such a conveyor path may include a frame element comprising a plurality of frame element openings corresponding to the geometrical frame mounting structure of the conveyor roller, in particular to cover protrusions provided on the side cover of the conveyor roller.

The frame element can comprise a profile rail, in particular a profile rail having a u-shaped cross section. The frame structure can comprise two frame elements mirroring each other on opposite sides of the conveyor roller. A plurality of conveyor rollers can be mounted between the frame elements. The two frame elements can have the same cross section.

According to a further embodiment of such a conveyor path the plurality of frame element openings may comprise more than three frame element openings. The openings may be located equidistantly along a straight line. The openings may extend continuously along the length of the frame element. A frame element mirrored on the opposite side of the conveyor roller may have the same configuration of the frame openings.

In the following, individual embodiments for achieving the object will be described by way of example with reference to the figures. The individual, described embodiments partly include features that are not absolutely necessary for realizing the claimed subject matter, but which provide characteristics desired for specific applications. Thus, embodiments not including all features of the embodiments described below are also considered to be disclosed by the described technical teaching. In order to avoid unnecessary repetitions, specific features will only be mentioned with respect to individual embodiments described in the following. It is pointed out that the individual embodiments are not to be contemplated only individually, but also in combination. From this combination, the skilled person will see that individual embodiments can be modified by incorporating one or more feature of other embodiments. It is pointed out that a schematic combination of individual embodiments with one or more features described with respect to other embodiments can be desirable and expedient, and therefore is to be taken into consideration and be considered to be comprised by the description.

BRIEF DESCRIPTION OF THE DRAWINGS

FIG. 3 shows a perspective view of an embodiment of a conveyor roller mounted in a frame structure of a conveyor path.

FIG. 4 shows a side view of the conveyor roller of FIG. 2.

FIG. 5 shows a perspective view of the conveyor roller of FIG. 2 and frame elements of the frame structure spaced apart.

DETAILED DESCRIPTION OF THE DRAWINGS

Figures 1, 2:
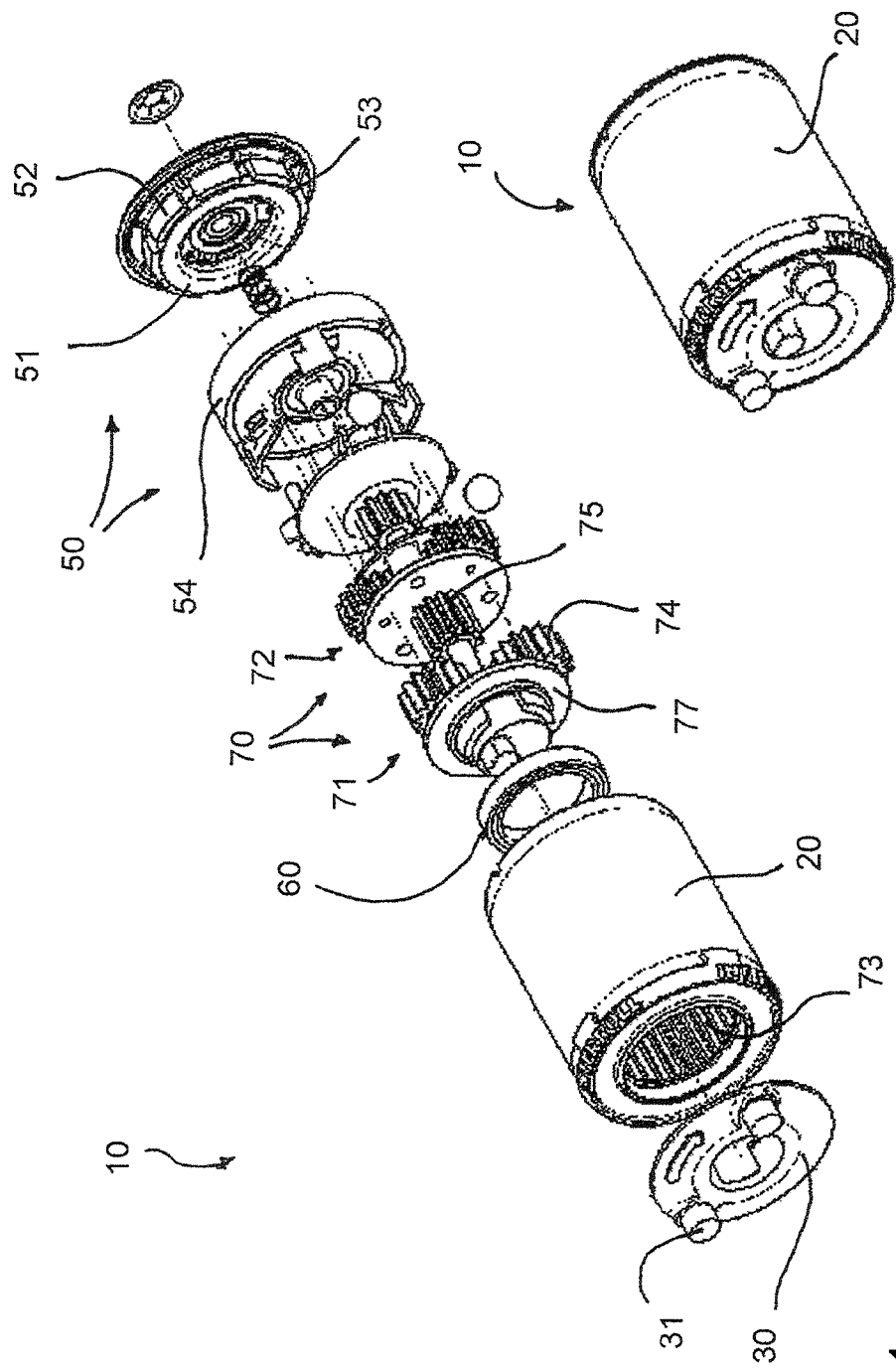
FIG. 1 shows a perspective view of components of an embodiment of a conveyor roller in an exploded view.
FIG. 2 shows a perspective view the complete conveyor roller of FIG. 1.

FIG. 1 shows a perspective view of components of an embodiment of a conveyor roller 10 in an exploded view.

The conveyor roller 10 comprises a sleeve element 20, a side cover 30, an acceleration unit 50, a bearing 60 and a transmission unit 70.

The acceleration unit 50 of the conveyor roller 10 shown in this embodiment is formed as a gearing comprising two planetary gearings forming a first gear stage 71 and a second gear stage 72. Each gear stage 71, 72 comprises satellite pinions 74 a sun gear 75 and a satellite holder 76 to which the satellite pinions 74 are attached. A common outer ring gear 73 for both gear stages 71, 72 is formed inside the sleeve element 20 of the conveyor roller 10. The satellite pinions 74 mesh with the sun gears 75 and the outer ring gear 73.

The transmission unit 70 is connected in a torque transmitting manner to the acceleration unit 50 which is formed as an eddy current brake according to this embodiment. The shown acceleration unit 50 comprises a magnetic component 51 with a plurality of magnets 52 attached to a magnet carrier 53 of the magnetic component 51. The braking component 54 comprises a tubular ring which is disposed in an axially displaceable manner allowing it to enter or leave the magnetic field generated by the magnets 52 of the magnetic component 51. If the tubular ring of the braking component 54 has entered the magnetic field and both components are turning with different rotational speeds an eddy current is generated in the tubular ring and consequently a braking torque is generated. The braking torque retards the sleeve element 20 and generates as a result a corresponding outer braking torque of the complete conveyor roller 10, which can be transferred and supported in a frame structure 80 of a conveyor path 1, as shown in FIGS. 3 to 5.

For transferring the braking torque to the frame structure 80 shown in FIGS. 3 to 5, the side cover 30 of the conveyor roller 10 is equipped with a geometrical frame mounting structure 31 which provides a form fit with respect to a corresponding structure of a frame element 81 of the frame structure 80. As can be seen throughout the figures the geometrical frame mounting structure 31 according to this embodiment comprises two cover protrusions. Both cover protrusions have a circular cross section corresponding to circular frame element openings 82 provided in the frame element 81 of the frame structure 80.

In the depicted embodiment the first gear stage 71 of the transmission unit 70 comprises a transmission component 77 comprising a transmission protrusion 773. The transmission protrusion 773 is designed for engaging one of the frame element openings 82. The transmission component 77 is formed integrally with the satellite holder 76 of the first gear stage 71.

FIG. 2 shows a perspective view of the complete conveyor roller 10 of FIG. 1. Here it can be seen that one of the two cover protrusions is provided on either side of the transmission protrusions 773 of the transmission component 77. All three protrusions 31, 773 are disposed in an equidistant manner along a straight line. Due to this design the conveyor roller 10 can be mounted at an arbitrary position along the frame structure 80 which has a plurality of frame element openings 82 distributed along the length of its frame element 81. Moreover, this design allows for simplification of the mounting procedure, since the protrusions 31, 773 can easily be slid into the corresponding frame element openings 82 without the need of further attachment steps.

FIG. 3 shows a perspective view of an embodiment of a conveyor roller 10 mounted in a frame structure 80 of a conveyor path 1. Here it is shown that the three protrusions 31, 773 are contained in corresponding frame element openings 82 of the frame element 81.

FIG. 4 shows a side view of the conveyor roller 10 of FIG. 2.

FIG. 5 shows a perspective view of the conveyor roller 10 of FIG. 2 and frame elements 81 of the frame structure 80 spaced apart.

Figure 6:
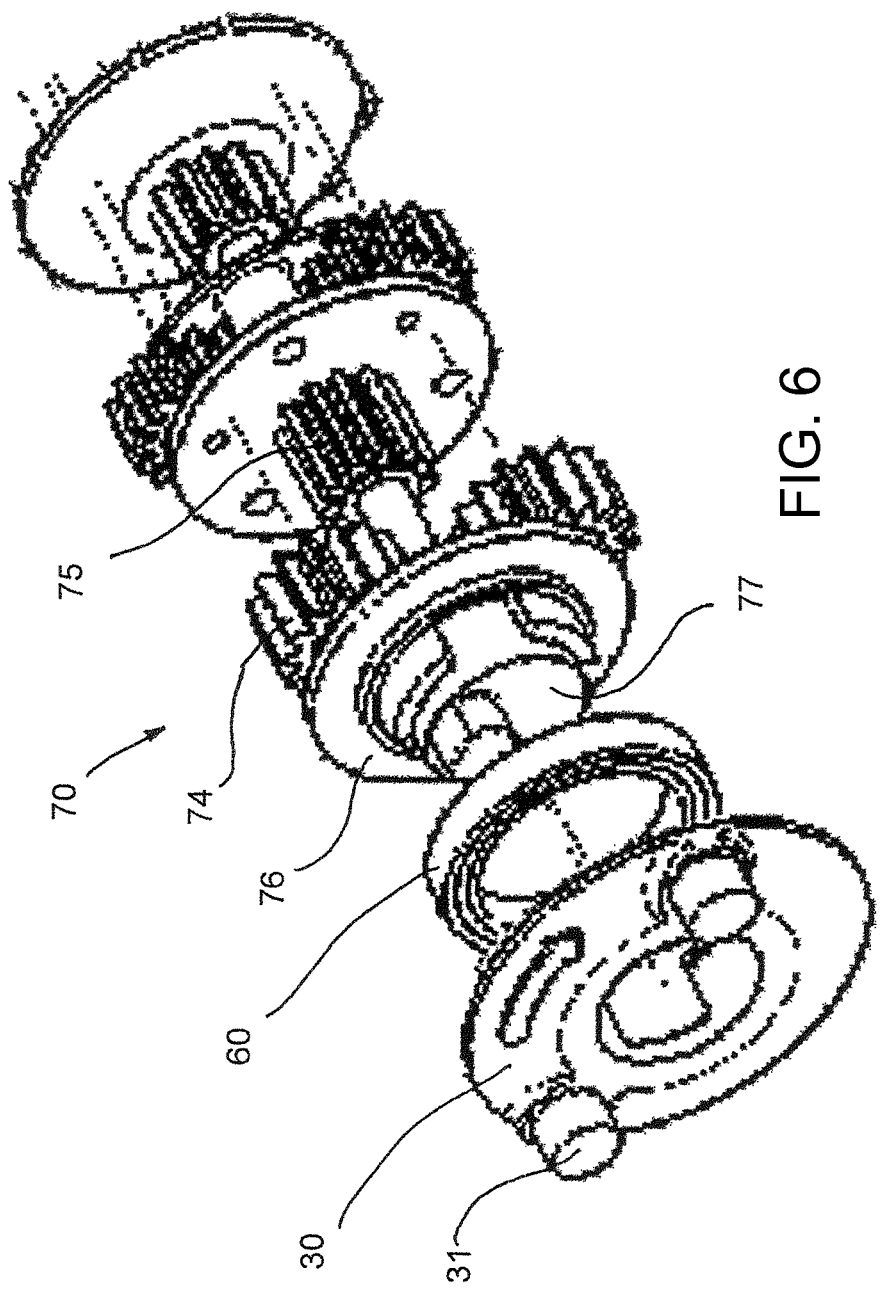
FIG. 6 shows a perspective view of some of the components of the conveyor roller shown in FIG. 1 in an enlarged exploded view.

FIG. 6 shows a perspective view of some of the components of the conveyor roller 10 shown in FIG. 1 in an enlarged exploded view.

In the depicted embodiment the side cover 30 is made of glass fibre reinforced polyamide and the transmission component 77 is made of a metal alloy called ZAMAK-5.

Since the cover protrusions 31 of the side cover 30 are located at a radially outward position on the side cover 30 and since the cover protrusions 31 are disposed at a distance from each other, a relatively high torque can be transferred to the frame element 81 via the cover protrusions 31.

Figure 7:
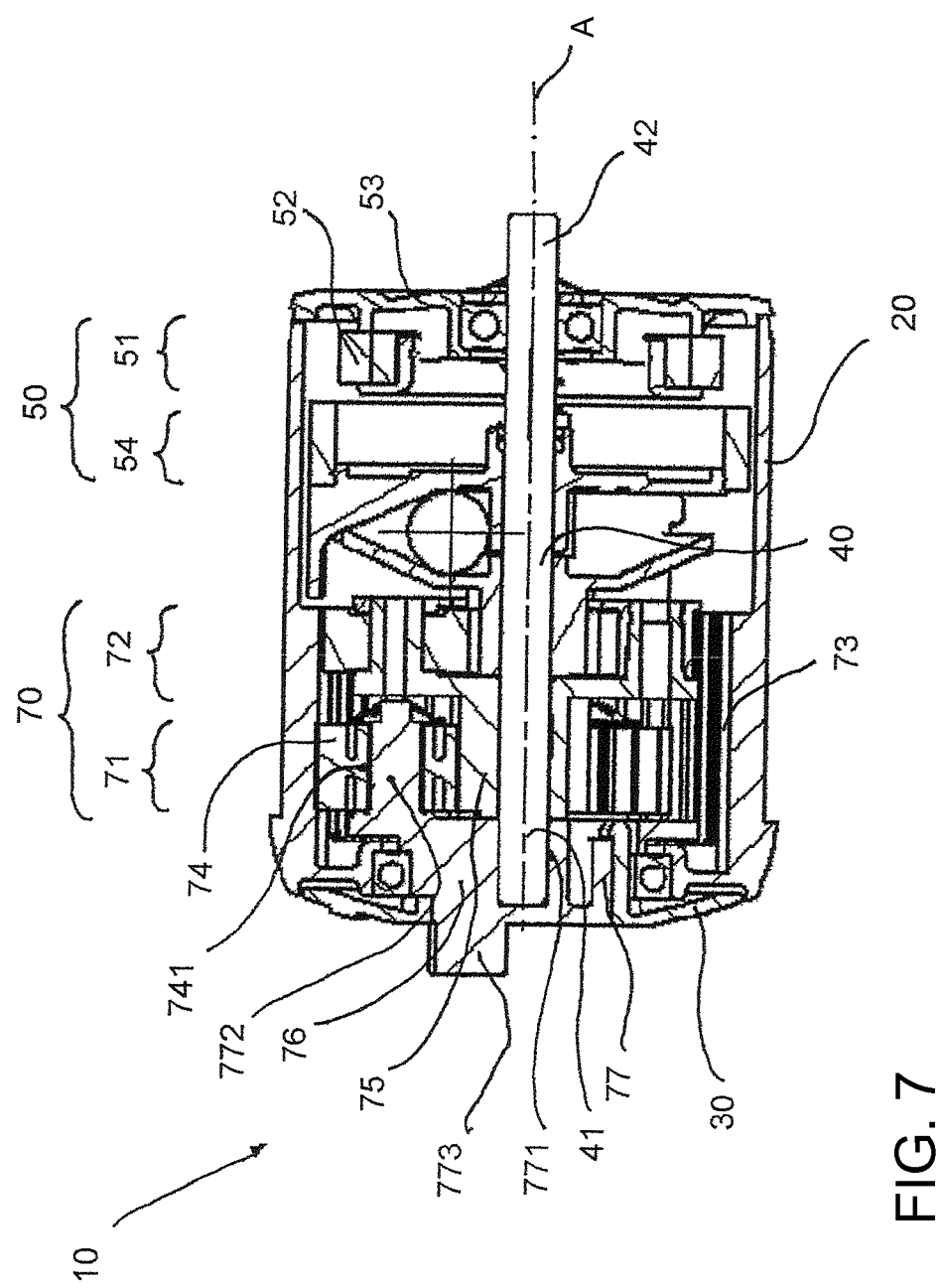
FIG. 7 shows a cross sectional side view of the conveyor roller of FIG. 2.

The transmission protrusion 773 is positioned slightly off centre with respect to an axis of rotation A of the sleeve element 20 shown in FIG. 7. The side cover 30 and the transmission component 77 are connected to each other in a torque proof manner, such that no torque needs to be transferred to the frame element 81 via the transmission protrusion 773. Instead, the torque acting on the conveyor roller 10 is transferred by the acceleration unit 50 to the transmission unit 70 including the transmission component 77. Then the torque is transferred from the transmission component 77 to the side cover 30, which is supported in a torque proof manner, and the frame element 81. The torque proof connection between the side cover 30 and the transmission component 77 is achieved by means of a form fit.

For providing the form fit the side cover 30 comprises three segments engaging, in an axial direction parallel to the axis of rotation A, into 3 corresponding recesses which are formed circumferentially at different equidistantly spaced positions around a hub portion of the transmission component 77. The three segments of the side cover 30 are designed in a flexible manner and include clipping means such that they can be clipped onto the transmission component 77. In the clipped-on position the segments and the hub portion of the transmission component 77 containing the recesses provide a circular hub surface corresponding to the inner diameter of an inner race of a roller bearing 60. The roller bearing 60 is biased in an axial direction and secured in position between the side cover 30 and the transmission component 77.

FIG. 7 shows a cross sectional side view of the conveyor roller 10 of FIG. 2. In this figure an axle 40 is shown having a first axial and 41 and a second axial end 42. In the depicted embodiment, the first axial end 41 is contained in an axle opening 771 of the transmission component 77. In this embodiment the axle opening 771 is formed as a blind hole which does not protrude to the outer side of the conveyor roller 10. Components of the conveyor roller 10 are mounted on the axle 40 in a rotatable manner such that no torque it is transferred by the rotatably mounted components to the axle 40. The axle 40 has a constant diameter along its complete length and its design is comparatively thin, since no torque has to be transferred via the axle 40. Accordingly the axle 40 can be produced at a comparatively low cost.

What is claimed is:

1. The conveyor roller (10), comprising a circular sleeve element (20), at least one side cover (30) covering one face side of the conveyor roller (10), an acceleration unit (50), and a transmission component connected to the side cover (30) in a rotationally fixed manner and kinematically located between the side cover (30) and the acceleration unit (50), the transmission component protruding through the side cover (30) and having at least one transmission protrusion (773) for mounting the conveyor roller (10) in a frame structure, the sleeve element (20) being rotatably supported about an axis of rotation of the sleeve element, the acceleration unit (50) being connected in a torque transmitting manner to the sleeve element (20) and the side cover (30) such that a rotational speed of the sleeve element (20) about the axis of rotation can be influenced by the acceleration unit (50), wherein the side cover (30) comprises a geometrical frame mounting structure on its outer side for mounting the conveyor roller (10) in a torque proof manner to a frame element by means of a form fit.

2. The conveyor roller (10) of claim 1, wherein the frame mounting structure comprises two cover protrusions formed on the side cover at a distance from each other.

3. The conveyor roller (10) of claim 1, wherein the transmission component forms part of a transmission unit which comprises at least one planetary gearing.

4. The conveyor roller (10) of claim 3, wherein the planetary gearing comprises a satellite holder and wherein the satellite holder is formed integrally with the transmission component.

5. The conveyor roller (10) of claim 1, wherein the conveyor roller (10) further comprises an axle element, wherein components of the transmission unit and/or components of the acceleration unit are rotatably supported on the axle element.

6. The conveyor roller (10) of claim 5, wherein a first axial end of the axle element is connected to the transmission component.

7. The conveyor roller (10) of claim 5, wherein a second axial end of the axle element is protruding through the conveyor roller on the side of the conveyor roller opposite to the transmission component.

8. The conveyor roller (10) of claim 1, wherein the conveyor roller comprises at least one roller bearing arranged for rotationally supporting the roller sleeve, wherein one of the at least one roller bearings, is sandwiched in between the side cover and the transmission component.

9. The conveyor roller (10) of claim 1, wherein the transmission component is made of a material comprising a metal and/or wherein the side cover is made of a synthetical material.

10. A conveyer path comprising a frame structure to which the conveyor roller of claim 1 is mounted.

11. The conveyer path of claim 10, wherein the frame structure includes at least one frame element comprising a plurality of frame element openings corresponding to the geometrical frame mounting structure of the conveyor roller, in particular to cover protrusions provided on the side cover of the conveyor roller.

12. The conveyer path of claim 11, wherein the plurality of frame element openings comprises more than three frame element openings being located equidistantly along a straight line.

\* \* \* \* \*